United States Patent
Megaridis et al.

(10) Patent No.: US 9,139,739 B2
(45) Date of Patent: Sep. 22, 2015

(54) METHOD FOR PREPARING MICRO-PATTERNED SUPERHYDROPHOBIC/SUPERHYDROPHILIC COATINGS

(71) Applicant: THE BOARD OF TRUSTEES OF THE UNIVERSITY OF ILLINOIS, Urbana, IL (US)

(72) Inventors: Constantine M. Megaridis, Oak Park, IL (US); Thomas M. Schutzius, Tinley Park, IL (US); Ilker S. Bayer, Genova (IT)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 13/942,494

(22) Filed: Jul. 15, 2013

(65) Prior Publication Data

US 2014/0017457 A1    Jan. 16, 2014

Related U.S. Application Data

(60) Provisional application No. 61/671,456, filed on Jul. 13, 2012.

(51) Int. Cl.
*C09D 1/00* (2006.01)
*C09D 5/00* (2006.01)

(52) U.S. Cl.
CPC .. *C09D 1/00* (2013.01); *C09D 5/00* (2013.01); *Y10T 428/24802* (2015.01); *Y10T 428/31663* (2015.04)

(58) Field of Classification Search
None
See application file for complete search history.

(56) References Cited

U.S. PATENT DOCUMENTS

| | | | |
|---|---|---|---|
| 2007/0231559 A1* | 10/2007 | Kim et al. | 428/315.7 |
| 2008/0221263 A1* | 9/2008 | Kanagasabapathy et al. | 524/588 |
| 2009/0018249 A1* | 1/2009 | Kanagasabapathy et al. | 524/434 |
| 2009/0064894 A1* | 3/2009 | Baumgart et al. | 106/18.32 |
| 2010/0143741 A1 | 6/2010 | Bell et al. | |
| 2011/0177252 A1 | 7/2011 | Kanagasabapathy et al. | |
| 2012/0009429 A1* | 1/2012 | Shmueli et al. | 428/447 |

OTHER PUBLICATIONS

Schutzius et al, Nanoscale, 4, pp. 5378-5395, No. 1-17; published on the web Jun. 26, 2012.*
Shirtcliffe et al, Chem. Commun., pp. 3135-3137, 2005.*
Chen et al, J. Phys. Chem., 113, pp. 8350-8356, 2009.*
Weng et al, Surface and Coatings Technology, 207, pp. 42-49, available online Jun. 7, 2012.*
Chiou et al., "Growth and alignment of polyaniline nanofibres with superhydrophobic, superhydrophilic and other properties," Nature Nanotechnology 2, 354-357 (2007).
Lai, et al., "Superhydrophilic-superhydrophobic unicropattern on TiO2 nanotube films by photocatalytic lithography," Electrochemistry Communications, vol. 10, Issue 3, Mar. 2008, pp. 387-391.
Rafiee, et al., "Superhydrophobic to Superhydrophilic Wetting Control in Graphene Films," Advanced Materials vol. 22, Issue 19, pp. 2151-2154, May 18, 2010.
Tadanaga et al., "Superhydrophobic-Superhydrophilic Micropatterning on Flowerlike Alumina Coating Film by the Sol-Gel Method," Chem. Mater. 2000, 12, 590-592.

* cited by examiner

*Primary Examiner* — Erma Cameron
(74) *Attorney, Agent, or Firm* — Michael Best & Friedrich LLP

(57) ABSTRACT

Provided herein are methods and materials for the production of hydrophobic coatings, which may be thermally treated to produce binary hydrophobic-hydrophilic regions.

19 Claims, 16 Drawing Sheets

(a)　　　　　　　　　　　(b)

(c)　　　　　　　　　　　(d)

METHOD FOR PREPARING MICRO-PATTERNED SUPERHYDROPHOBIC/SUPERHYDROPHILIC COATINGS

CROSS REFERENCE TO RELATED APPLICATION

This application claims priority to U.S. Provisional Application No. 61/671,456, filed Jul. 13, 2012, which is incorporated herein by reference in its entirety.

STATEMENT OF GOVERNMENT INTEREST

This invention was made with government support under Grant No.: CBET-1066426 awarded by the National Science Foundation. The government has certain rights in the invention.

FIELD OF THE INVENTION

The present invention relates to the manufacture and use of micro-patternable hydrophobic coatings, which may or may not contain hydrophilic regions. Degree of wettability of the coating ranges from superhydrophobic (untreated) to superhydrophilic (heat-treated).

BACKGROUND

The wettability of a material is dependent on both its physical and chemical characteristics. If a liquid spreads completely across the surface of a material and forms a film, the contact angle, θ, is close to 0 degrees(°). If the liquid beads on the surface, the surface is considered to be non-wetting. For water, the substrate surface is considered to be hydrophobic if the contact angle is greater than 90°. Certain applications may require a hydrophobic coating with a high contact angle of at least 150°. These coatings may be said to be superhydrophobic.

Surfaces patterned with alternating (binary) hydrophobic-hydrophilic regions offer a template for efficient fluid collection and management technologies. Micro-fluidic channels and wettability micro-patterns produced from various photo-degradation techniques of hydrophobic chemistry or plasma chemical approaches provide avenues for producing various forms of hydrophilic micropatterns on hydrophobic surfaces. However, most patterning techniques require the use of masks (e.g., plasma chemical, photodegradation techniques, photo-induced techniques, UV-irradiation) or closed environmental chambers. Masks limit the flexibility in changing the type of pattern during the process, while chambers limit scalability and increase the patterning costs. Finally, in some superhydrophilic patterning techniques, the property is not permanent. Such coatings also require large concentrations of filler particles to attain superhydrophilicity, which may reduce their adhesion and durability as compared with other coating systems.

A non-toxic, environment friendly process for forming surfaces with binary hydrophobic-hydrophilic regions is desired. Compared to other organic-based approaches, advantages of such a process will include inherent thermal stability and scalability to large-area applications.

SUMMARY OF THE INVENTION

Provided herein is a method for preparing a hydrophobic coating. The method comprises forming a dispersion of a hydrophobic silsesquioxane (HSQ) and a hydrophobic fumed silica (HFS) in a solvent. The solvent may be alcohol. The alcohol may be a mixture of one or more of methanol, n-butanol, ethanol, and isopropanol. The HFS is silica that may be modified with a compound selected from the group consisting of a silane, a silazane, and a siloxane. The HFS may be a siloxane-modified silica. The HFS may be a silane-modified silica. The dispersion may have from 3.0 wt % to 3.5 wt % of MSQ, from 0.0 wt % to 8.5 wt % of HFS, and from 88 wt % to 97 wt % of isopropanol. The alcohol may be a mixture of one or more of methanol, n-butanol, and isopropanol. The dispersion may be formed via sonication.

The dispersion may then be applied or deposited onto a surface to form a coating on the surface. The coating may then be dried to evaporate the solvent.

The HSQ may have the formula

wherein R is selected from the group consisting of hydrogen, an alkyl, an alkylene, an aryl, an arylene, an organo-functional derivative of an alkyl group, an organo-functional derivative of an alkylene group, an organo-functional derivative of an aryl group, and an organo-functional derivative of an arylene group. The HSQ may be a hydrogen silsequioxqane and/or methyl silsesquioxane. The ratio of HFS/HSQ may be greater than 1.0.

The coating may exhibit an advancing contact angle of at least 150°. The dispersion may be deposited onto a surface via a spray. The coating may exhibit a droplet sliding angle of less than 10°.

The method may further comprise introducing a hydrophilic area to the hydrophobic composition, wherein an area of the hydrophobic coating is subjected to heat, which may be localized. The heat will decrease the hydrophobicity of the area subjected to the heat. The area subjected to the heat will have an advancing contact angle of equal to or less than 10°. The area subjected to the heat will have an advancing contact angle of equal to or less than 5°. The area subjected to the heat will have an advancing contact angle of 0°. The heat applied to the hydrophobic coating may be between 500° C. and 800° C. The heat may be applied via a $CO_2$ laser or a propane flame. The area may be subjected to a temperature of greater than 300° C. for greater than 45 minutes. The surface may be a material such as steel, aluminum, copper, quartz, glass, fabric, silicon, or a combination thereof.

Also provided herein is a hydrophobic composition formed by coating a surface with the dispersion.

Provided herein is a hydrophobic and hydrophilic composition made by forming a dispersion of a hydrophobic silsesquioxane (HSQ) and a hydrophobic fumed silica (HFS) in a solvent as described herein. The dispersion may be deposited onto a surface to form a coating on the surface. The coating may then be dried to evaporate the solvent. The hydrophilic area may be formed on the hydrophobic composition as described herein. The application of heat will decrease the hydrophobicity of the area subjected to the heat.

DETAILED DESCRIPTION

Figure 1:
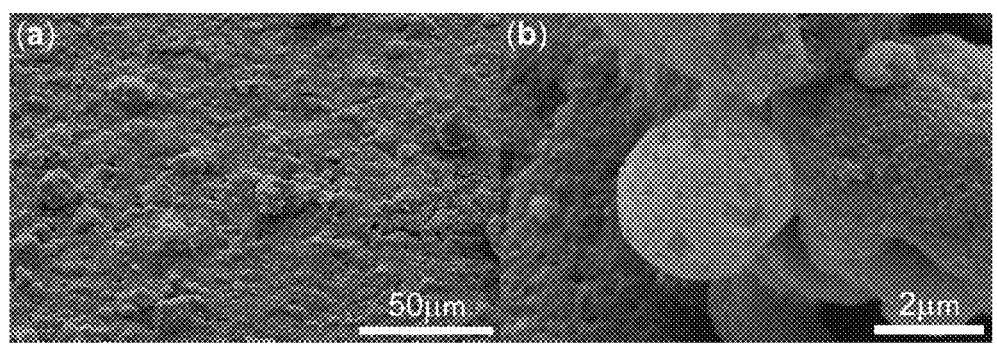
FIG. 1 shows Environmental Scanning Electron Microscope (ESEM) images of superhydrophobic MSQ-HFS coating (1.0 HFS/MSQ mass ratio) with increasing magnification from (a) to (b).

The inventors have made the surprising discovery that a simple wet-processing, thermal treatment method may be used to produce surfaces patterned with binary hydrophobic-hydrophilic regions. The hydrophobic-hydrophilic regions may be superhydrophobic-superhydrophilic regions. The method centers on the production of an inherently superhydrophobic polysilsesquioxane-silica composite coating. The composition coating may be subjected to localized thermal treatment. For example, when laser processed, the coatings are patternable down to O (10 µm) scales. Several micropatterned wettability surfaces demonstrate their usefulness in pool boiling heat transfer enhancement, capillarity-driven liquid transport in open surface-tension-confined channels (e.g., lab-on-a-chip), and surface coating applications that rely on wettability gradients.

1. DEFINITIONS

The terminology used herein is for the purpose of describing particular embodiments only and is not intended to be limiting. As used in the specification and the appended claims, the singular forms "a," "and" and "the" include plural references unless the context clearly dictates otherwise.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. METHOD OF PREPARING A HYDROPHOBIC COATING

Provided herein is a method of preparing a hydrophobic coating. The method comprises forming a dispersion of a hydrophobic silsesquioxane (HSQ family of compounds) and a hydrophobic fumed silica (HFS). The HSQ and HFS may be dispersed in a solvent, such as an alcohol. The dispersion may then be applied to a surface, such as a solid surface. Once applied, the dispersion may form a coating on the surface, which is then dried so as to remove the solvent from the coating.

a. Dispersion

The dispersion may be a two phase system where one phase contains discrete particles of HSQ and HFS distributed throughout the solvent. The particles constitute the dispersed or internal phase, and the solvent the continuous or external phase. At least a portion of the HSQ and/or HFS may exist as the discrete particle. Dispersions are possible through the use of certain components that are insoluble in the solvent system. It is desirable that the dispersion remains stable under ambient conditions. Preferred dispersions are stable at room temperature for more than 30 days, preferably more than 90 days, more preferably for more than 180 days, and most preferably for more than 360 days.

The dispersion may be formed by combining, in any order, HFS, HSQ, and the solvent. Any of the resultant compositions may be sonicated to produce the dispersion. For example, HFS and solvent may be combined and sonicated to form a suspension. Once the suspension is formed, the HSQ may be added to it. The entire suspension may then be sonicated to stabilize the suspension and form the dispersion. Alternatively, for example, the HFS, HSQ, and the solvent may be mixed and then sonicated to form the dispersion. Any sonication method may be used, such as bath or probe sonication. Dispersions may be formed by combining HFS, MSQ, and the solvent under mechanical mixing at ambient conditions.

The dispersion may comprise from 3 wt % to 3.5 wt % of HSQ. The dispersion may comprise from 15 wt % to 18 wt % of 20% HSQ in a solvent, such as alcohol. The dispersion may comprise from 16 wt % to 17 wt % of 20% HSQ in alcohol. The dispersion may comprise 16.0 wt %, 16.1 wt %, 16.2 wt %, 16.3 wt %, 16.4 wt %, 16.5 wt %, 16.6 wt %, 16.7 wt %, 16.8 wt %, 16.9 wt %, or 17.0 wt % of 20% HSQ in alcohol.

The dispersion may comprise from 0.0 wt % to 9.0 wt % of HFS. The dispersion may comprise from 0.0 wt % to 8.3 wt % of HFS. The dispersion may comprise from 0.5 wt % to 8.0 wt % of HFS. The dispersion may comprise from 1.0 wt % to 8.5 wt %, from 2.0 wt % to 7.5 wt %, from 3.0 wt % to 6.5 wt %, from 4.0 wt % to 5.5 wt %, or from 4.5 wt % to 5.0 wt % of HFS.

The ratio of HFS/HSQ may be greater than 1.0. The ratio of HFS/HSQ may be greater than 1.1, 1.2, 1.3, 1.4, 1.5, 1.6, 1.7, 1.8, 1.9, or 2.0, for example. The ratio of HFS/HSQ may be from 1.0 to 4.5, from 1.0 to 4.0, from 1.0 to 3.5, from 1.0 to 3.0, from 1.0 to 2.5, from 1.0 to 2.0, or from 1.0 to 1.5, for example.

The dispersion may comprise from 70 wt % to 97 wt % of alcohol. The dispersion may comprise from 75 wt % to 85 wt %, from 70 wt % to 80 wt %, from 78 wt % to 82 wt %, or from 74 wt % to 84 wt % of alcohol. The dispersion may comprise from 75.0 wt % to 83.3 wt % of alcohol.

(1) HSQ

The HSQ may be any compound having the following structure:

$RSiO_{1.5}$ wherein R may be a hydrogen, an alkyl, an alkylene, an aryl, an arylene, an organo-functional derivative of an alkyl group, an organo-functional derivative of an alkylene group, an organo-functional derivative of an aryl group, or an organo-functional derivative of an arylene group. For example, the HSQ may have a structure as shown below (a-f), wherein T refers to the number of Si atoms in the structure:

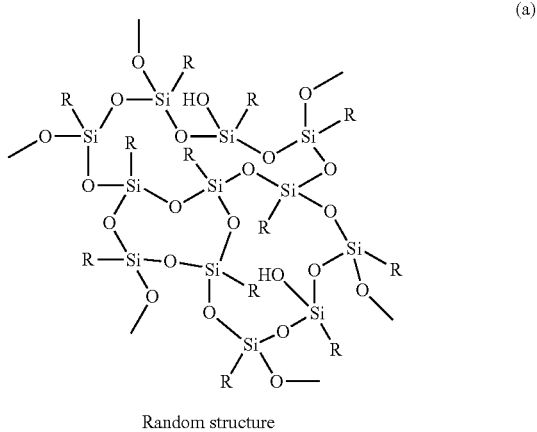

Random structure

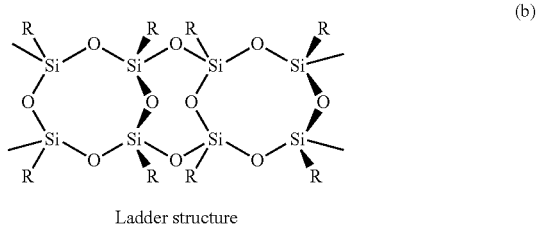

Ladder structure

-continued

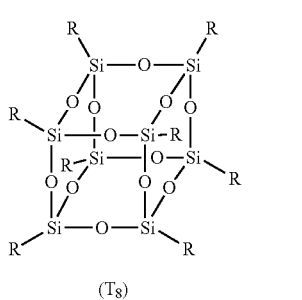

(T$_8$)

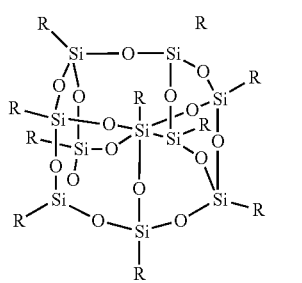

(T$_{16}$)

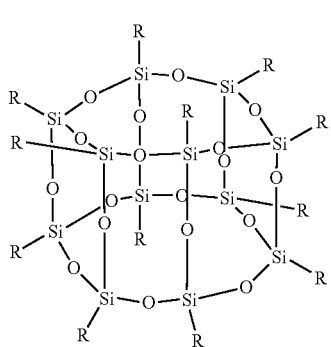

(T$_{12}$)

Cage structures

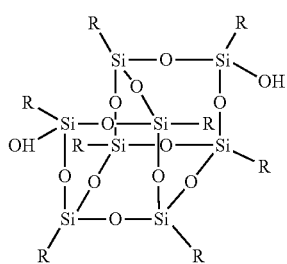

Partial cage structure

Examples of HSQ further include hydrogen silsesquioxane and methyl silsesquioxane, for example. The HSQ may or may not be in a solvent.

(2) HFS

The HFS may be any silica made hydrophobic ("hydrophobized"). The silica may be synthetic silica. The silica may be hydrophobized with a silicium-organo compound, such as a silane, a silazane, or a siloxane. The silica may be hydrophobized by being coated with a wax, by esterifying the silanol groups with long-chain fatty alcohols, and/or by linking the silanol groups with one or more polyamines. The HFS compound may be purchased from Evonik Industries under the product names Aerosil® (Aerosil R 972, Aerosil R 974, Aerosil R 805 Aerosil R 812 (trimethylsilyl functionalized), and Aerosil R 812 S). The HFS may or may not be in a solvent.

(3) Solvent

The solvent may be any alcohol. The alcohol may be one or more of a monohydric alcohol, an unsaturated aliphatic alcohol, a polyhydric alcohol, and/or an alicyclic alcohol, for example. The monohydric alcohol may be methanol, ethanol, isopropyl alcohol, butyl alcohol, pentanol, and/or hexadecane-1-ol, for example. The polyhydric alcohol may be one or more of ethane-1,2-diol, propane-1,2-diol, propane-1,2,3-triol, butane-1,2,3,4-tetraol, pentane-1,2,3,4,5-pentol, hexane-1,2,3,4,5,6-hexyl, and heptane-1,2,3,4,5,6,7-heptol, for example. The unsaturated aliphatic alcohol may be one or more of prop-2-ene-1-ol, 3,7-dimethylocta-2,6-dien-1-ol, and prop-2-in-1-ol, for example. The alicyclic alcohol may be one or more of cyclohexane-1,2,3,4,5,6-hexyl, and 2-(2-propyl)-5-methyl-cyclohexane-1-ol, for example.

b. Deposition

The dispersion may be deposited or applied to a surface. The dispersion may be applied to any surface that can withstand heat treatment during the formation of regions or patterns or etchings of hydrophilic nature on the dried deposition. Such a surface may be steel, aluminum, copper, quartz, glass, fabric, and/or silicon. The deposition may be performed at standard temperature and pressure, except for various specified heating steps, which may or may not include drying of the coating. The method of deposition may be an aerosol assisted method, dip-coating, and/or spin coating. The aerosol assisted method may be spray deposition or spray casting. The spray casting may be accomplished with an atomizer, for example. A single layer can be deposited on a substrate or multiple layers could be applied. In general, deposition of the one or more layers can be performed by any suitable evaporative coating operation such as dip-coating or drainage, spin-coating, Mayer rod coating, slot coating and other liquid-to-solid coating operations, for example.

c. Drying

The coating may be dried. The purpose of drying is to remove the solvent from the coating. Once the solvent is removed, the drying step may be complete. The drying may be accomplished by any suitable method for drying including, for example, letting the coating dry at ambient temperature for a period of time, drying the coating in an oven, and/or treating the coating with heat from a heat gun. The coating may be subjected to drying temperatures of from 20° C. to 140° C., from 25° C. to 130° C., from 30° C. to 120° C., from 40° C. to 110° C., from 50° C. to 100° C., from 60° C. to 90° C., from 70° C. to 80° C., for example. The coating may be subjected to a temperature of from 120° C. to 140° C. The coating may be subjected to heat only for a period of time needed to remove the solvent from the coating. For example, the coating may be dried for 5 minutes to 10 hours, from 30 minutes to 9 hours, from 1 hour to 8 hours, from 2 hours to 7 hours, from 3 hours to 6 hours, or from 4 hours to 5 hours, for example. The drying time may depend on the method of drying. The coating may be dried at 130° C. for 1 hour.

3. METHOD OF INTRODUCING HYDROPHILIC REGION(S) TO HYDROPHOBIC COATING

The hydrophobic coating may be treated to form regions or patterns or etchings of hydrophilic nature. The coating may be treated locally to form the regions or patterns or etchings of hydrophilic nature. For the purpose of introducing this wettability transition, heat is applied to the coating. The heat may take on any form. The form of heat may be laser or flame, for example. The laser may be a $CO_2$ laser. The coating may be exposed to $CO_2$ treatment for a time on the order of milliseconds. The coating may be exposed to $CO_2$ laser treatment for between 1 millisecond and 1 second, for example.

The flame may be a propane or other hydrocarbon flame. The coating may be exposed to an open flame. The open flame may be from a standard torch. The flame may impinge on the surface of the coating. The coating may be exposed to the flame for 1 second to 5 minutes or 1 second to 1 minute, for example. The coating may be exposed to the flame for several seconds. This application of heat will locally decrease the hydrophobicity of the area subjected to the heat. The application of the heat may vary in intensity and duration. The decrease in hydrophobicity may depend on the intensity and duration of the heat.

The laser may be set to low-, medium-, or high-power setting. Wettability transitions may be realized faster if the laser beam power is increased. The laser fluence may be greater than 130 J $cm^{-2}$, greater than 135 J $cm^{-2}$, greater than 140 J $cm^{-2}$, greater than 145 J $cm^{-2}$, or greater than 150 J $cm^{-2}$, for example. The laser fluence may be from 130 J $cm^{-2}$ to 250 J $cm^{-2}$, from 135 J $cm^{-2}$ to 230 J $cm^{-2}$, from 140 J $cm^{-2}$ to 220 J $cm^{-2}$, from 145 J $cm^{-2}$ to 200 J $cm^{-2}$, or from 150 J $cm^{-2}$ to 175 J $cm^{-2}$, for example.

The laser may have a beam power of from 0.2 W to 2 W, of from 0.5 W to 2 W, of from 0.8 W to 2 W, of from 1 W to 2 W, of from 1.5 W to 2.0 W, of from 0.8 W to 1.2 W, of from 0.9 W to 1.1 W, of from 0.7 W to 1.3 W, or from of from 0.6 W to 1.4 W. The laser may have a beam power of about 1 W. The laser may have a beam power of up to 20 W, for example. Accordingly, the laser may have a beam power of from 0.2 W to 20 W. A higher beam power may result in faster laser translation speeds. For example, a 20 W beam power may result in a laser translation speed of about 0.3 m/s.

The laser may have a beam diameter of from 25 nm to 100 nm, of from 50 nm to 100 nm, of from 75 nm to 100 nm, of from 25 nm to 30 nm, of from 25 nm to 28 nm, or of from 25 nm to 50 nm. The laser may have a beam diameter of 25 nm.

The laser may have a translation speed of from 0.5 cm $s^{-1}$ to 4.0 cm $s^{-1}$, of from 1.5 cm $s^{-1}$ to 3.0 cm $s^{-1}$, of from 2.5 cm $s^{-1}$ to 4.0 cm $s^{-1}$, of from 1.0 cm $s^{-1}$ to 3.0 cm $s^{-1}$, of from 2.0 cm $s^{-1}$ to 3.0 cm $s^{-1}$, of from 2.2 cm $s^{-1}$ to 2.7 cm $s^{-1}$, or of from 2.3 cm $s^{-1}$ to 2.6 cm $s^{-1}$. The laser may have a translation speed of 2.5 cm $s^{-1}$. The laser may have a translation speed of from 0.5 cm/s to 0.3 m/s, from 1.0 cm/s to 0.3 m/s, or from 2.0 cm/s to 0.3 m/s.

The laser irradiance may be calculated as ≈0.2 MW $cm^{-2}$. The laser irradiance may be calculated as from ≈0.1 MW $cm^{-2}$ to ≈0.3 MW $cm^{-2}$, for example.

The heat applied to the coating to form hydrophilic regions may locally heat the coating to temperatures above 500° C. The heat applied to the coating to form hydrophilic regions may locally heat the coating to temperatures in the range of from 500° C. to 1250° C., from 550° C. to 1100° C., or from 600° C. to 900° C., for example. The heat may be applied only for so long as to produce a hydrophilic area having an advancing contact angle of equal to or less than 10°. The resultant advancing contact angle may be equal to or less than 9°, equal to or less than 8°, equal to or less than 7°, equal to or less than 6°, equal to or less than 5°, equal to or less than 4°, equal to or less than 3°, equal to or less than 2°, or equal to or less than 1°.

The heat may be applied only for so long as to produce a hydrophilic area having a contact angle hysteresis of equal to or less than 15°. The resultant contact angle hysteresis may be equal to or less than 14°, may be equal to or less than 13°, may be equal to or less than 12°, may be equal to or less than 11°, may be equal to or less than 10°, may be equal to or less than 9°, equal to or less than 8°, equal to or less than 7°, equal to or less than 6°, equal to or less than 5°, equal to or less than 4°, equal to or less than 3°, equal to or less than 2°, or equal to or less than 1°.

4. DISPERSION COMPOSITIONS, HYDROPHOBIC COATINGS, AND BINARY HYDROPHOBIC-HYDROPHILIC COATINGS

Figure 2:
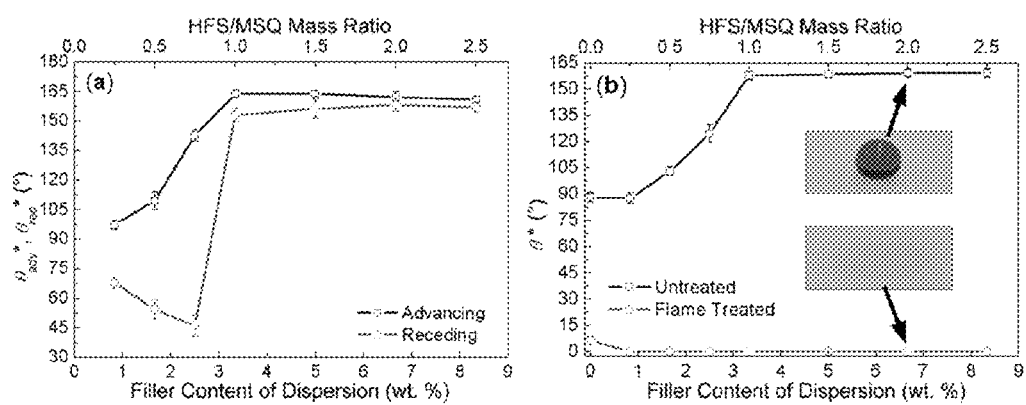
FIG. 2 shows (a) Apparent advancing ($\theta^*_{adv}$) and receding ($\theta^*_{rec}$) water contact angles, and (b) sessile θ* water contact angle vs. filler content of the dispersion (bottom axis) and HFS/MSQ mass ratio (top axis). Insets in (b) show blue-dyed water droplets: Top demonstrating beading on the untreated superhydrophobic surface; bottom demonstrating superhydrophilicity (fully spread droplet) attained after the coating was heat-treated with a flame.
Figure 11:
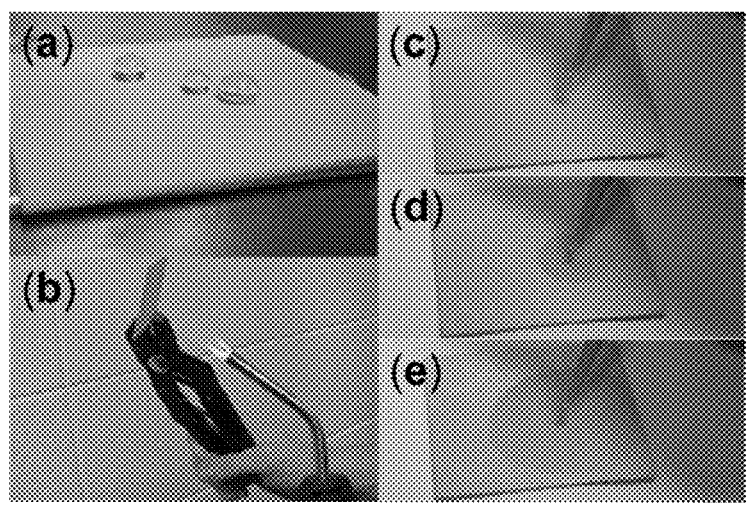
FIG. 11 shows (a) photograph of beaded water droplets on a MSQ-HFS film applied on an aluminum plate. (b) Flame treatment of the coating shown in (a) using a propane torch for a few seconds from a distance of 5-10 cm. (c) Photograph of the flame-treated coating just before depositing a water droplet ($\cong$10 µL). (d) Completely wetting droplet spreading on the flame-treated coating. (e) Completely wetting droplet at its final fully-spread state.

Compositions or articles comprising the hydrophobic or binary coatings are provided herein. The compositions may be, for example, components for dehumidifiers, components for condensation apparatuses, components for distillation apparatuses, components for boiling applications, bio-medical and microfluidic devices, protective layers for semiconductors, anti-corrosion coatings, films on windows, home appliances, roofs, greenhouses, sun rooms, swimming pool enclosures, and the like. The compositions are of particular utility in the manufacture of pipes, such as heat exchanger pipes, for example.

Directed motion of droplets may be useful in the creation of container-less, surface-tension confined fluidic devices that are non-fouling, easy to clean, and allow transport of highly concentrated fluids with no loss to the walls. Concentrated fluid samples will overcome a major current obstacle in dielectrophoretic (DE) separations. The ability to coalesce drops also can provide the means to perform highly controlled reactions upstream of the fluidic analysis and has implications also for flow cytometry.

The herein described dispersions may be useful as compositions to be applied to any surface than can withstand the heat treatment step. For example, the dispersion may be useful for any of the above-described applications.

The present invention has multiple aspects, illustrated by the following non-limiting examples.

EXAMPLES

Example 1

Effects of Deposition of Dispersion

The purpose of introducing hydrophobic, inorganic nanoparticles into the spray dispersion is to affect the coating surface texture resulting after application and drying—a well-established approach for achieving superhydrophobicity. FIG. 1*a* illustrates the characteristic micro-cluster surface morphology of a MSQ-HFS coating (1.0 HFS/MSQ mass ratio) applied by spray, while the higher magnification image in FIG. 1*b* displays the resulting nanotexture due to HFS particles embedded in the MSQ matrix. Such hierarchical surface texture is known to produce superhydrophobicity on both artificial and natural surfaces. FIG. 2*a* presents the advancing ($\theta^*_{adv}$) and receding ($\theta^*_{rec}$) contact angles as functions of HFS concentration in the MSQ matrix. Contact angle hysteresis ($\theta^*_{adv}-\theta^*_{rec}$) initially increases with HFS filler content (i.e. surface roughness), followed by an abrupt decrease as the HFS concentration increases further, indicating a wetting state transition (i.e., Wenzel to Cassie-Baxter). Beyond a 1.0 HFS/MSQ mass ratio, the coating becomes superhydrophobic (i.e. $\theta^*_{adv}>150°$). The Cassie-Baxter (non-wetting) state should be realized if the true (Young's) contact angle (θ) satisfies the condition $$\theta > \theta_c, \text{ with } \cos\theta_c = -\frac{1-\Phi_s}{r-\Phi_s} \quad (1)$$

where the surface roughness factor r is defined as the ratio of true rough area to its projected value, $\Phi_s$ represents the fractional solid surface area in contact with the liquid ($\Phi_s$<1), and $\theta_c$ is the critical contact angle. For very rough surfaces with a high concentration of filler particles or rough surface texture due to the spray process itself, it follows that r>>$\Phi_s$, and the cosine of the critical angle, $\theta_c$, is proportional to $-r^{-1}$; thus, for highly rough, hydrophobic surfaces (θ>90°), the value of $\theta_e$ from Eq. 1 decreases, and Cassie-Baxter becomes the most probable wetting state, not considering metastable wetting states. As shown in FIG. 2a, the contact angle hysteresis is 8° at a HFS/MSQ mass ratio of 1.5, which designates a self-cleaning surface (droplets roll off the surface under only a slight substrate tilt). Further rise in hydrophobic filler concentration results in a further decrease of contact angle hysteresis. FIG. 2b presents sessile contact angle values (θ*) for the previously characterized coatings, before and after flame treatment. For all cases where HFS filler is incorporated into MSQ, the coatings achieve a zero-valued or immeasurably small apparent contact angle after flame treatment, thus indicating superhydrophilicity. See FIG. 11 for a sequence of images demonstrating flame treatment and the subsequent induced superhydrophilic property. The dramatic transition from non-wetting to fully-wetting state should be observed if the cosine of the true (Young's) contact angle satisfies the condition $$\theta < \theta_C \text{ with } \cos\theta_C = \frac{1-\Phi_S}{r-\Phi_S} \quad (2)$$

where $\theta_C$ (0°<$\theta_C$<90°) is the critical contact angle for transition to wetting. If the condition for θ in Eq. 2 is satisfied, then the liquid penetrates the surface texture but partial wetting remains due to islands emerging above the absorbed film (i.e., θ≠0°). Regarding morphological changes as a result of brief flame treatment, the coating is not observed to undergo drastic changes, i.e., r remains relatively high. In the limit of $\Phi_s$<<r, Eq. 2 becomes $$\theta < \theta_C \text{ with } \cos\theta_C \approx \frac{1}{r}. \quad (3)$$

Therefore, for highly rough, hydrophilic surfaces (θ<90°, the value of $\theta_C$ from Eq. 2 is high, and the superhydrophilic state becomes most probable—alternatively stated, highly wettable surfaces require less roughness to display superhydrophilicity.

Example 2

Delineation of the Effects of HFS Filler Content and Thermal Treatment

Figure 3:
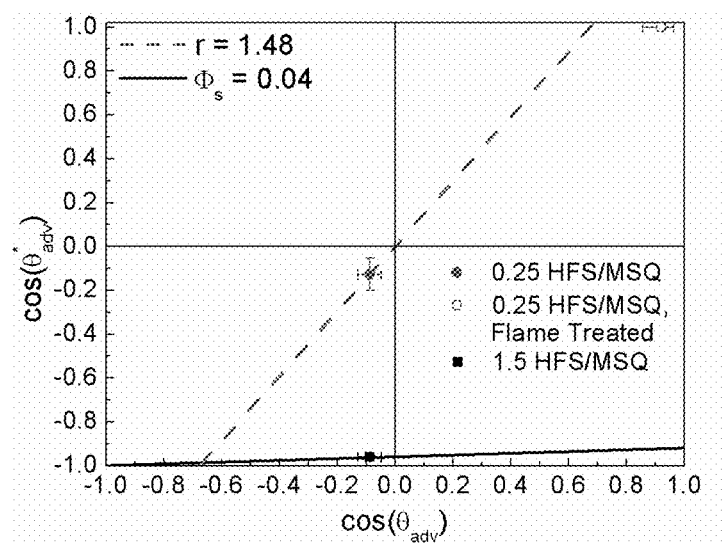
FIG. 3 shows water apparent advancing contact angle $\theta^*_{adv}$ for spray cast, HFS filler-containing coatings vs. $\theta_{adv}$ for spin-coated MSQ (both angles plotted in terms of their cosines). Coatings contain different concentrations of HFS, as indicated in the legend. Unfilled data points indicate flame-treated coatings. Plotted lines are for the two wetting theories; the dashed line is for Wenzel (Eq. 5 with r=1.48), while the solid line is for Cassie-Baxter (Eq. 4 with $\Phi_s$=0.04).

To delineate the effects of HFS filler content (which affects texture) and thermal treatment (which affects surface energy), FIG. 3 presents apparent advancing contact angles for spray cast MSQ-HFS composite films vs. $\theta_{adv}$ of spin-coated MSQ before and after flame treatment. The values of $\theta_{adv}$ for spin-coated MSQ before and after flame treatment were measured to be 95° and 23°, respectively. Two HFS/MSQ mass ratios (0.25 and 1.5) are represented in FIG. 3. Also plotted in the same figure are the lines for two theoretical cases, namely Cassie-Baxter (Eq. 4 below with $\Phi_s$=0.04) and Wenzel (Eq. 5 below with r=1.48). For the Cassie-Baxter case, the apparent contact angle is given by $$\cos\theta^* = -1 + \Phi_s(\cos\theta + 1) \quad (4)$$

while for the Wenzel case $$\cos\theta^* = r\cos\theta \quad (5)$$

As stated previously, for the heat-treated (wettable) MSQ, $\theta_{adv}$=23°. Taking $\theta_{adv}$ as a conservative approximation of $\theta_C$, and substituting into Eq. 3, we see that the lower threshold value of r for the validity of Eq. 3 comes as, r*=1/cos$\theta_{adv}$≈1.1, which is an easily attainable roughness ratio. It is possible to quantify the roughness ratio of the coating prior to flame treatment by utilizing Eq. 5; the only requirement is that the liquid droplet be in a Wenzel wetting state. At 0.25 HFS/MSQ mass ratio, the measured $\theta_{adv}$ value is relatively small (~97'; see FIG. 2a) and the hysteresis is high (~30'; FIG. 2a), which are characteristic traits of droplets in a partially wetting Wenzel state, thus allowing use of Eq. 5 to quantify r (note that this particular point falls in the hydrophobic regime of FIG. 3 and is prior to coating flame treatment). The dashed line Wenzel fit with r=1.48 shows that the 0.25 HFS/MSQ mass ratio coating is consistent with a roughness value sufficiently higher than the threshold value of 1.1, thus allowing the most stable wetting state, after flame treatment, to be superhydrophilic (assuming negligible morphological changes due to flame treatment). Intuitively, this corresponds to a MSQ-HFS film that is sufficiently wettable (i.e., possesses high surface energy) to require only a low level of roughness for superhydrophilicity to be energetically favored. Also in FIG. 3, the data point for untreated 1.5 HFS/MSQ mass ratio coating resides in the lower left quadrant, suggesting that the water droplet is in a stable Cassie-Baxter wetting state, and not a metastable one (metastable states generally reside in the lower right quadrant of FIG. 3). Thus, this point can be fitted with the Cassie-Baxter curve, $\Phi_s$=0.04, suggesting a very low fraction of the textured solid being in contact with the beaded liquid.

Figure 16:
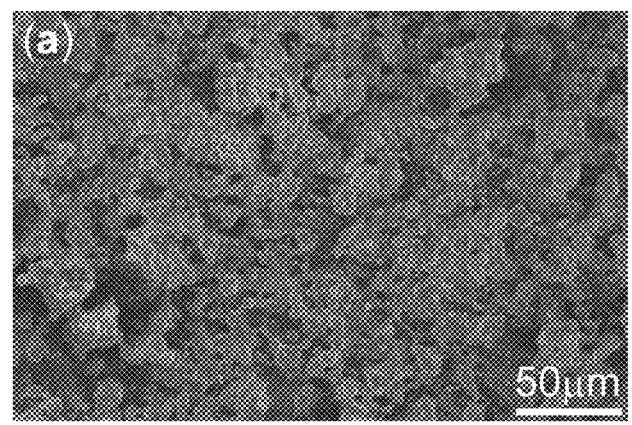
FIG. 16 shows (a)-(b) SEM micrographs of spray deposited MSQ-HFS coatings (1.0 HFS/MSQ mass ratio) with increasing magnification top-to-bottom after flame treatment (i.e., superhydrophilic coating).
Figure 16:
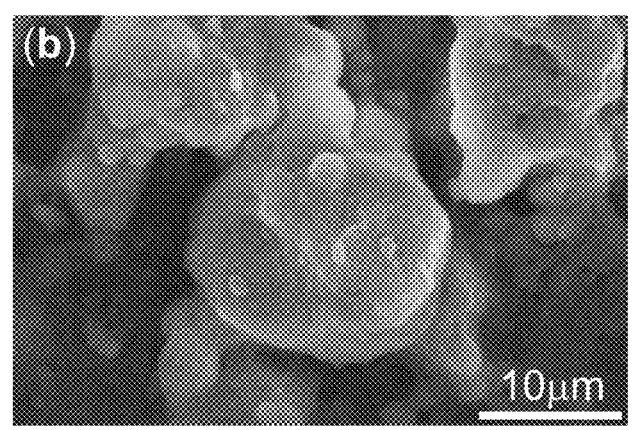

While local gas temperatures in propane flames can rise to 2200 K, small propane flames impinging onto coated bulk surfaces for 1-2 seconds are not capable of raising coating temperatures up to the melting point of silica (~1900 K). Consequently, during flame treatment, the coating temperatures stay well below this critical value, thus eliminating the possibility of significant morphological changes in the coating texture. See FIG. 16 for SEM images of a flame-treated MSQ-HFS coating.

Example 3

Figure 4:
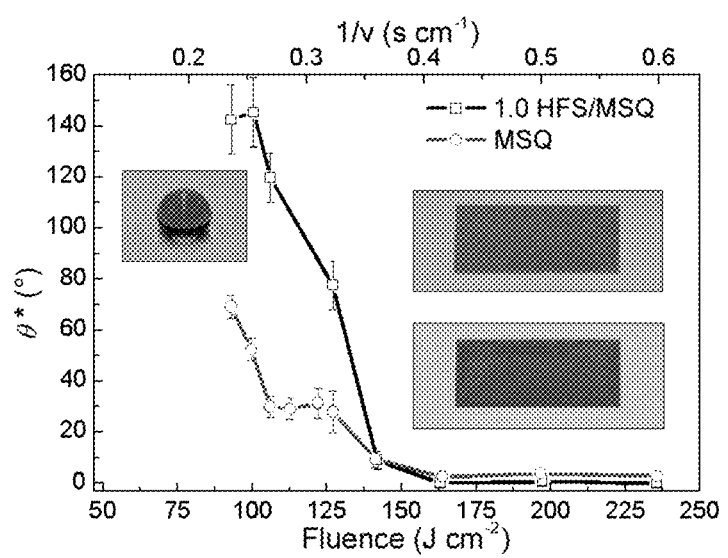
FIG. 4 shows sessile contact angle ($\theta^*$) vs. laser fluence of the coating (bottom axis) and inverse laser translation speed (top axis; laser irradiance was held constant at I~0.20 MW cm$^{-2}$). Inset images show: (top left) a blue-dyed water droplet on a superhydrophobic coating (1.0 HFS/MSQ mass ratio) prior to laser treatment, (top right) a dry rectangular area of the coating treated by the laser, and (bottom right) same treated area as above, but fully wetted by a blue-dyed water droplet. The area outside the rectangle is untreated (i.e., remains superhydrophobic), thus remaining dry. All further laser processing was done with a laser translation speed of 2 cm s$^{-1}$.

Laser Treatment of Wettability $CO_2$ lasers offer a controlled approach to thermal treatment due to their ability to deliver high levels of energy to localized surface areas. Since most materials are opaque at 10 μm (laser wavelength), $CO_2$ lasers offer a robust approach to surface heat treatment. Heating can be regulated by tuning beam size and energy, as well as beam exposure. FIG. 4 quantifies the effect of laser treatment on wettability of pure MSQ and MSQ-HFS films as a function of laser exposure. For these tests, laser power was held constant at ~1 W and the laser translation speed was varied. For sufficiently high fluence (i.e., >150 J cm$^{-2}$), the films underwent a wettability transition to complete wetting, as indicated by the very low values of θ* in FIG. 4, and as previously observed for the flame-treated films (cf. FIG. 2b). It is instructive to compare the temperature ranges attained in both thermal treatment processes. In the case of propane flames, the flame temperature is ~2,200 K. For laser treatment, direct temperature measurement is difficult due to the low exposure time to the laser beam. For a laser spot diameter ($d_s$) of ~25 μm and a translation speed (v) of 2.0 cm s$^{-1}$ (the speed used for all subsequent laser treatments), the exposure time scales like $d_s/v \approx 1$ ms. The corresponding rise in surface temperature (ΔT) can be estimated using an expression applicable for a semi-infinite solid medium heated on a spot $$\Delta T(t) = \frac{(1-R)I}{K}\left(\frac{\delta}{\sqrt{\pi}} - \frac{1}{\alpha}\left(1 - e^{(\alpha\delta/2)^2}\text{erfc}(\alpha\delta/2)\right)\right) \quad (6)$$

where R is the surface reflection coefficient, I the irradiance (uniform surface source), K the thermal conductivity, δ the diffusion length ($\delta = 2\sqrt{\kappa t}$; with κ being the thermal diffusivity and t the time), and α the absorption coefficient. With R=0.05, K=0.01 W cm$^{-1}$ K$^{-1}$, κ=6.0×10$^{-3}$ cm$^2$ s$^{-1}$, α=10$^3$ cm$^{-1}$ for glass,$^2$ and I≈0.2 MW cm$^{-2}$, Eq. S1 predicts that ΔT~2,000 K after only t=0.022 ms, a temperature that is comparable with the propane flame temperature.

After only t=0.022 ms, ΔT 2,000 K, a temperature that is comparable with the propane flame temperature. So while this temperature is sufficient to explain wettability transition as a result of laser treatment, it is insufficient to explain morphological changes. At t=0.025 ms, ΔT becomes 2,230 K which is sufficient to cause silica boiling. Significant removal of coating material should be expected as thermal treatment extends far further than the time required to reach temperatures required for wetting transitions, potentially resulting in channel formation (for a single laser pass) or a thinner coating (for total surface treatment), the latter being advantageous for heat transfer applications, where the thermal resistance associated with thicker coating treatments must be minimized.

Figure 12:
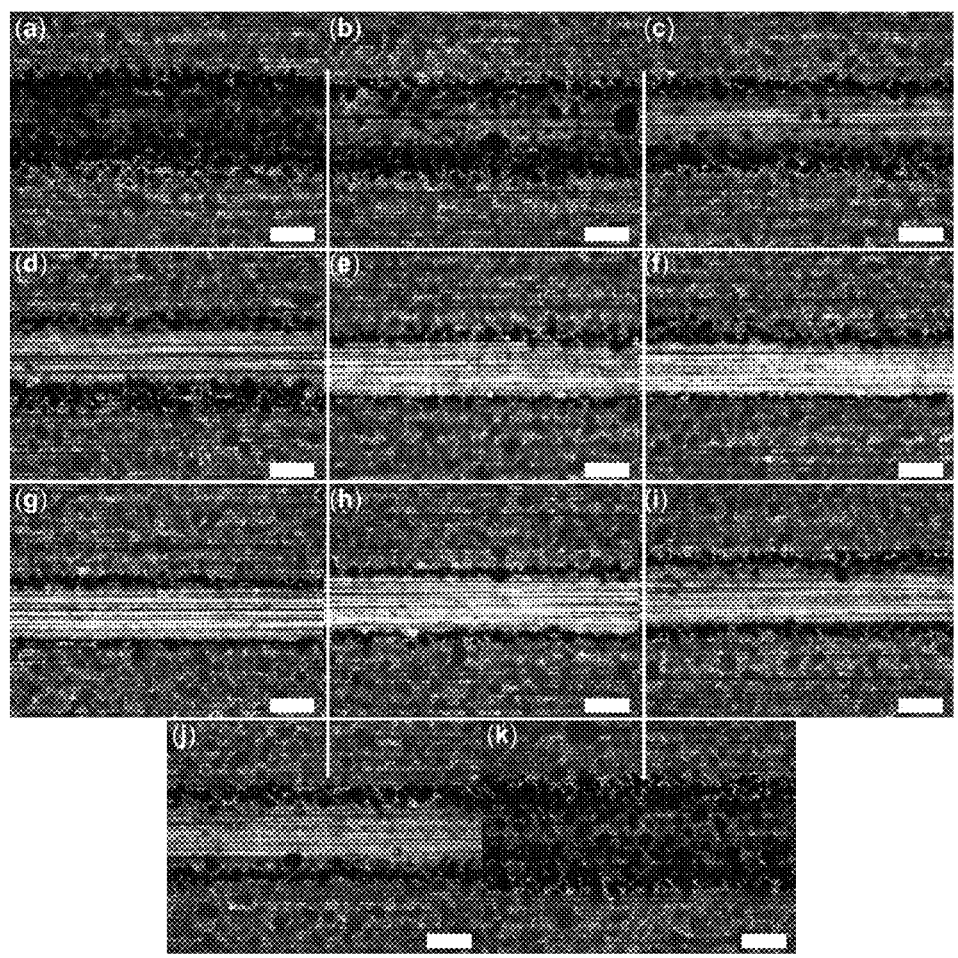
FIG. 12 shows superhydrophobic MSQ-HFS coatings patterned with a single pass of a $CO_2$ laser beam at a fixed power (1.0 W) and speed (2.0 cm s$^{-1}$) with a constant focal length and variable distance between the lens and the substrate. The distance between the laser and the substrate is decreasing from (a) to (k) (i.e., (a) has the largest distance between the lens and substrate; (k) has the smallest distance between the lens and substrate). The optimum range is between (e)-(h) with the minimum line width in (g) being 109±6 µm. Inset scale bars in the images are all 100 µm.

It is important to establish the minimum spatial feature size during CO$_2$ laser processing. The diameter of the focused laser spot is defined as $$d_s = \frac{4}{\pi}\lambda\frac{f}{D} \quad (7)$$

where f is the beam focal length, D the initial beam diameter, and λ the beam wavelength. We employed a high power density lens with a 25 μm spot diameter. According to the manufacturer, it is feasible to produce a finer spot diameter by diverging the beam, but this generally resulted in inadequate thermal treatment, i.e., the treated surfaces did not become superhydrophilic. Optimization of the laser-lens-to-substrate distance was done by observing when superhydrophilicity was or was not achieved (see FIG. 12). It is also important to understand the wetting transition between hydrophobic and hydrophilic areas, and more importantly, the spatial extent of this transition. A sharp transition will allow the surface to confine liquids, which has important ramifications on microfluidics and lab-on-a-chip applications.

Figure 5:
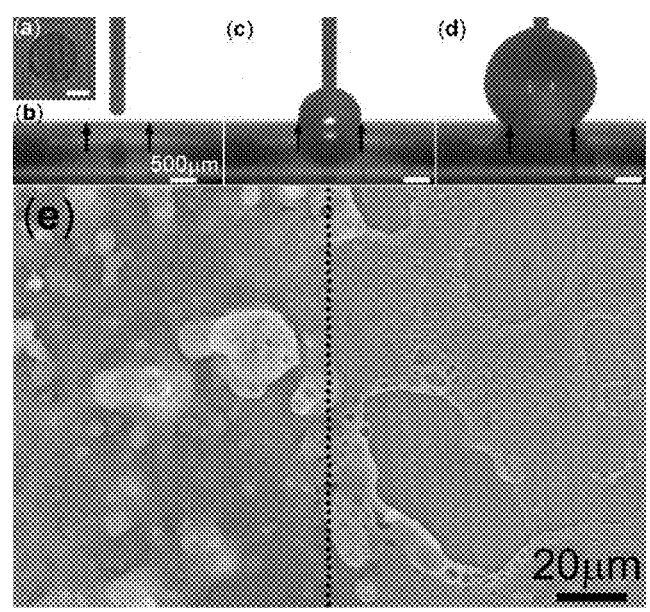
FIG. 5 shows a sequence of images showing an advancing water contact angle measurement at the transition between a superhydrophilic (laser treated) and the surrounding superhydrophobic area. Inset in (a) shows the laser treated, hydrophilic, circular spot on the superhydrophobic coating (1.5 HFS/MSQ mass ratio) prior to water droplet deposition (scale bar is 500 nm). The scale bars in (c) and (d) are 500 nm. Arrows in (b)-(d) mark the outer extent of the laser treated area. Part of the needle in (d) is obscured by the liquid. (e) is a SEM micrograph depicting the transition area with a vertical dashed line separating the hydrophobic (left) from the hydrophilic area (right).
Figure 6:
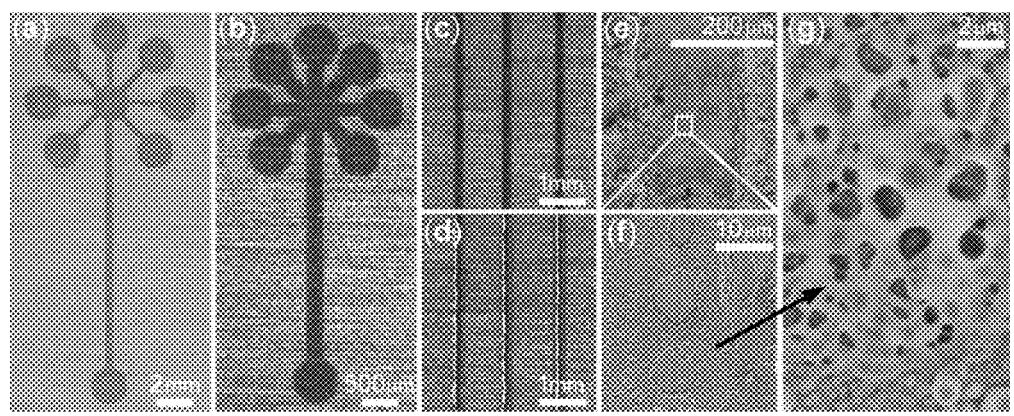
FIG. 6 shows (a) photographic and (b) optical microscope images of laser-treated superhydrophilic patterns (dark) on a superhydrophobic MSQ-HFS coating; (c) Hydrophilic, laser patterned lines (dark), and (d) surface-tension-confined (STC) channel showing wetting of the lines in (c) by water through capillary action. (e)-(f) SEM images of a laser-treated coating area with increasing magnification; (g) SEM image of a laser patterned area revealing porosity. For 0.18 mm-wide STC channels, the water propagation velocity was measured to be 2.5 mm s$^{-1}$.

FIG. 5a presents a CO$_2$ laser patterned hydrophilic circular spot in a hydrophobic background. FIG. 5b-d presents a hydrophilic spot being characterized by an advancing water contact angle measurement; the edges of the hydrophilic spot are marked by dark arrows. As the water is dispensed from the needle, the droplet readily advances to the edge of the hydrophilic pattern, and once there, it pins. The droplet remains pinned at that location as it grows above it, until it achieves a high contact angle value, and begins to advance once again, but this time with a high contact angle, indicating superhydrophobicity. This experiment demonstrates the spatially abrupt wettability transition on the patterned surface. SEM analysis also confirms a sharp transition of the coating from superhydrophobic to superhydrophilic, as shown in FIG. 5e, left-to-right through the dashed-line boundary. FIG. 6a-d shows examples of STC microchannels with and without deposited water; e-f show SEM micrographs of the channels with increasing magnification. It is obvious that laser-treatment (I≈0.2 MW cm$^{-2}$, $d_s$=25 μm, v=2.0 cm s$^{-1}$) has removed much of the coating material, thus creating a physical channel. FIG. 6g shows a high-magnification micrograph of the patterned area where laser treatment caused cellular morphology. While during flame treatment the pre-existing surface roughness remained relatively unchanged (as confirmed from SEM analysis; see FIG. 16), the laser treatment actually produced its own unique surface texture, facilitating superhydrophilicity. FIG. 6f actually shows coating areas that have been completely stripped by the laser processing; these areas form apparently bare islands with the remaining coated sections percolating, thus allowing superhydrophilicity to persist. Further optimization of spray processing (i.e., increased coating thickness) should reduce the likelihood of bare-island formation. An important property of STC channels is the average flow velocity of water in them. In the case of a 7.2 mm-long 0.18 mm-wide channel formed with the present procedure, the average water flow velocity was 2.5 mm s$^{-1}$, which is comparable to speeds attained by others in similar sized channels.

Figure 7:
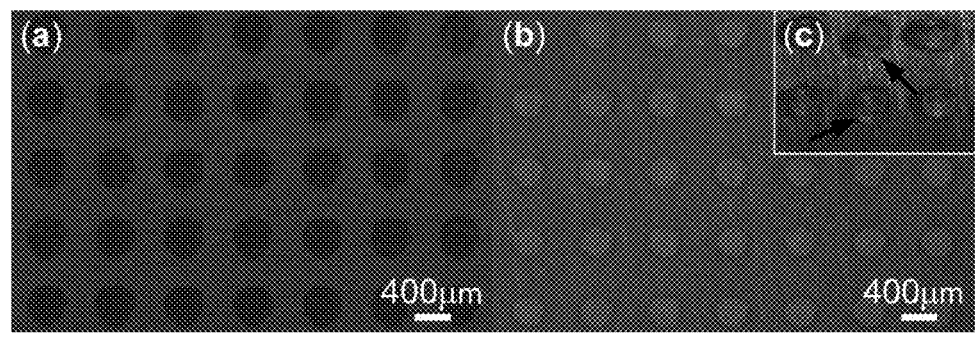
FIG. 7 shows superhydrophobic MSQ-HFS coating deposited onto copper substrates and laser-processed to create hydrophilic patterns. (a) Superhydrophophilic spots on superhydrophobic background; (b) Superhydrophophobic spots on superhydrophilic background; (c) Pattern from (b) placed in a water bath and subjected to heating; the hydrophobic islands act as preferred gas nucleation sites—arrows indicate vapor bubbles that grow gradually and detach before this cycle repeats itself over and over. The consistent control of localized vapor nucleation shown in FIG. 7(c) may have energy-related applications (for example, heat transfer in pool boiling or convective boiling).
Figure 13:
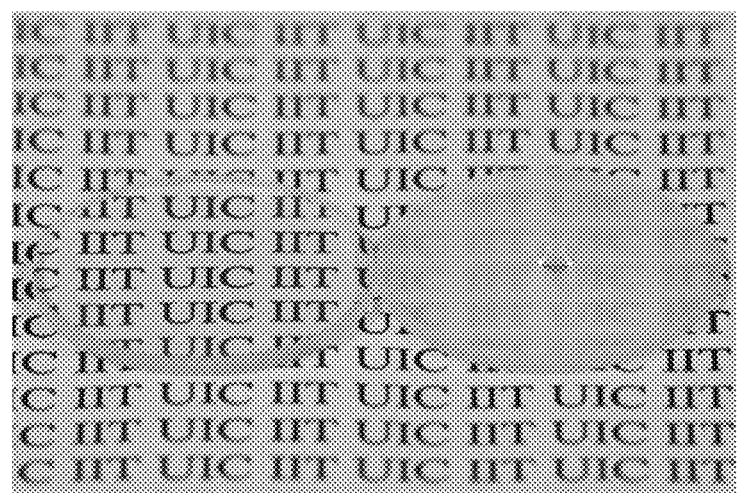
FIG. 13 shows superhydrophobic MSQ-HFS film deposited onto two quartz disk substrates (2.54 cm dia.) before (right) and after (left) laser processing, which induces hydrophilicity and increases transparency. A water droplet has been deposited on each surface, but is visible as a bead only on the superhydrophobic disk (center right). The droplet on the superhydrophilic disk (left) has fully spread, thus becoming indistinguishable.

Laser-treated areas appear visually different than non-treated areas. As shown before (FIG. 6), laser processing removes the top portion of the coating. The resulting surface is a thin, glassy coating devoid of the micro-features originating from spray application and appears more optically transparent (see FIG. 13). For heat transfer applications, a thin coating or surface treatment is desirable, as minimal thermal resistance is required. For pool boiling applications, it has been recently reported that selective patterned areas of hydrophobicity and hydrophilicity on surfaces, improves heat transfer characteristics (i.e., heat transfer coefficient, critical heat flux). The demonstrated feature sizes were in the ~100 μm range with either hydrophobic or hydrophilic networks. FIG. 7a-b show laser patterning of similar ~100 μm repeatable feature sizes of either hydrophobic or hydrophilic nature, while c shows what happens when the patterned surface shown in FIG. 7b is subjected to nucleate boiling conditions; the hydrophobic islands act as preferred nucleation sites for boiling, in line with previously reported results.

Example 4

Durability of Extreme Wetting Properties

Figure 8:
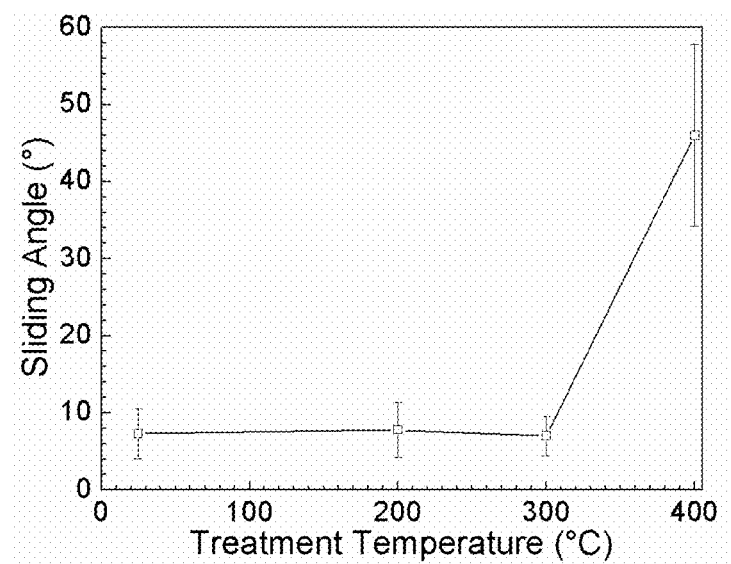
FIG. 8 shows water droplet sliding angle vs. treatment temperature of a superhydrophobic coating (1.5 HFS/MSQ mass ratio). Coatings were treated for 1 hr on a hot plate in open air. At 500° C. treatment temperature, the water droplet ceased to slide, indicating full-loss of the superhydrophobic property of the coating.

An important property of these MSQ-HFS films is their ability to maintain extreme wetting properties during and after heating. Determination of the temperature at which these surfaces change wettability is important. FIG. 8 presents water droplet sliding angle measurements as a function of temperature treatment of the coating on a hot plate for one hour. At treatment temperatures below 300° C., the sliding angles are well below 10°, indicating self-cleaning ability for these coatings. For treatment above 300° C., the coating begins to undergo a change in its superhydrophobic property. After treatment at 500° C., the coating ceases to display droplet sliding behavior with the water droplets remaining pinned, indicating a full-loss of superhydrophobicity and the Cassie-Baxter wetting state, and marking a temperature limit for the application of this coating. The ability to maintain superhydrophobic behavior even after thermal treatment at 300° C. (i.e., no degradation, no melting, etc.) puts this composite coating in class with some of the high-performance thermoplastics which have melting points above 300° C. (e.g., poly(ether ether ketone)).

Example 5

Thermal Properties of MSQ and HFS Coating Ingredients

Figure 9:
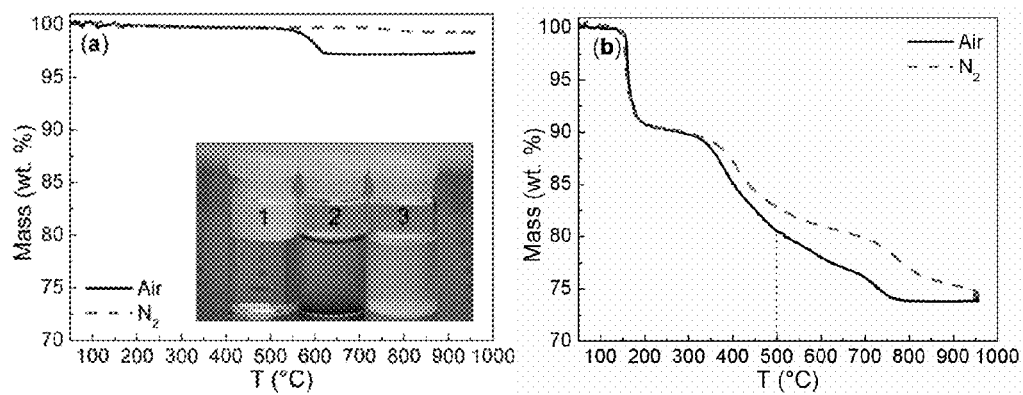
FIG. 9 shows Thermogravimetric Analysis (TGA) plots (mass vs. T) for (a) HFS, and (b) MSQ under different gas atmospheres (nitrogen, air). The inset in (a) shows three 15 mL glass vials containing 10 g of water and 0.07 g HFS. The HFS contained in vial 1 was not subjected to prior TGA treatment, while the HFS in vials 2 and 3 was. For the HFS in vial 2, TGA was performed under nitrogen conditions. For vial 3 it was run under artificial air conditions. In (b), the dotted ( . . . ) drop-down line denotes the thermal treatment temperature (1 hr, open air, hot plate) for a superhydrophobic coating (1.5 HFS/MSQ mass ratio) above which total loss of droplet sliding behavior was observed (see FIG. 8). This temperature marked the beginning of the wettability transition (non-wettable to wettable).
Figure 10:
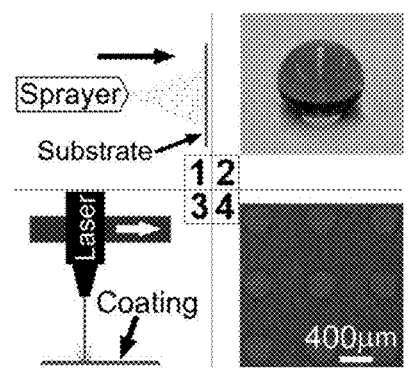
FIG. 10 shows spray deposition (1) of large-area superhydrophobic coatings (2), and subsequent localized thermal treatment (3) via laser resulted in fabrication of superhydrophilic/superhydrophobic binary patterned areas (4). Using a $CO_2$ laser, patterned wettability feature sizes of ~100 microns were demonstrated. Such binary patterns are suitable for enhanced heat transfer applications as well as surface tension confined microchannels (i.e., lab on chip).

In order to further explore the thermal properties of the MSQ and HFS coating ingredients, FIG. 9 presents two separate TGA plots, one for HFS (a) and the other for pure MSQ (b). In the case of HFS tested under nitrogen atmosphere conditions, no significant mass loss was detected, while under oxidative conditions of artificial air (80% $N_2$, 20% $O_2$), a 2.3 wt. % mass loss was detected between 530-630° C. It is suggested that this mass loss is attributed to oxidation of alkyl groups in the HFS, which results in formation of oxygen containing functional groups and evolution of volatile CO, $CO_2$ and $H_2O$. According to the manufacturer, the concentration of carbon in the HFS, as induced by the wettability modification of silica, is in the range of 0.7-1.3 wt %. This is quite close to the TGA mass loss (2.6 wt %) seen in the oxidizing atmosphere, and thus carbon presence in the HFS could be responsible for this mass reduction. HFS becomes dispersible in water after thermal treatment at 900° C. in artificial air (see inset image in FIG. 9a, vial 3) and retains its white color (i.e., no pyrolysis), supporting alkyl group oxidation as the probable mass loss mechanism. For MSQ in FIG. 9b, the TGA shows three significant mass losses at 159° C., 377° C., and 719° C. for oxidizing conditions (artificial air) and at 154° C., 406° C., and 771° C. for inert conditions (nitrogen). Regarding the first mass loss (159° C.), the coating remains self-cleaning after thermal treatment at 200° C. (see FIG. 8), so this mass loss is irrelevant in the context of superhydrophobicity. A previous study attributed such mass loss to condensation of silanol groups and loss of siloxane. For the mass loss of MSQ at medium temperature (300-500° C.), this is the temperature range where loss of superhydrophobicity is observed. The effect of mass loss on wettability at ~400° C. is unclear, but the associated loss of superhydrophobicity there may be due to MSQ melting, which affects surface texture—a major factor in superhydrophobicity—more than it is due to chemical changes and mass loss of MSQ. At 500° C., the coating begins to undergo a color change from its original white to black, and chemical changes begin to play a prominent role. Heating MSQ in air or $O_2$ above 600° C. results primarily in the formation of $SiO_2$, which is used for production of silica glasses. In the case of flame or laser treatment in open air, one can expect more extreme thermal treatment than that delivered by TGA testing; transformation of hydrophobic methyl groups to hydrophilic —OH groups can thus be expected.

Figure 14:
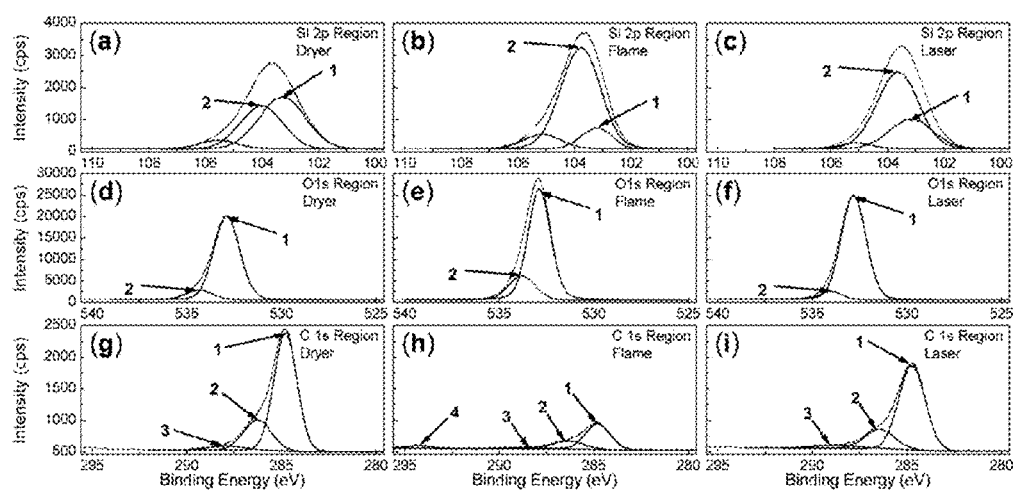
FIG. 14 shows X-ray Photoelectron Spectroscopy (XPS) data of untreated (superhydrophobic) and heat-treated (superhydrophilic) MSQ-HFS coatings. (a)-(c) Si 2p region; (d)-(f) O is region; (g)-(i) C is region. Figures in the left column represent untreated state, while figures in the middle and right columns are the corresponding thermally-treated states. Thermal treatment was performed by either a flame ((b), (e) and (h)) or $CO_2$ laser ((c), (f) and (i)). For a given region, each peak is designated by a number.

High-resolution XPS analysis of silicon, oxygen, and carbon was done on untreated, flame treated, and laser treated MSQ-HFS (1.0 HFS/MSQ mass ratio) coatings. This analysis supported the TGA data, in turn, suggesting increased concentration of Si—O bonding and reduced concentration of Si—R bonding (i.e., methyl) with heating, both consistent with the observed increased silica concentration and decreased hydrophobicity (FIG. 14).

Figure 15:
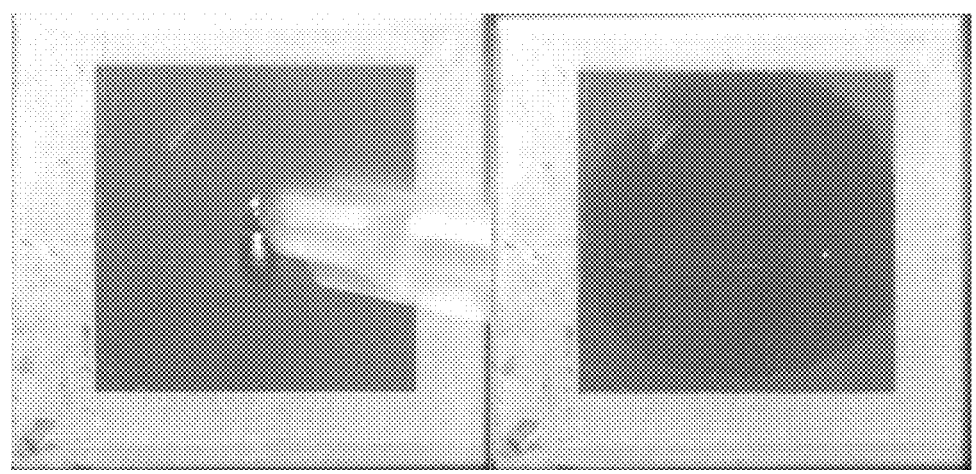
FIG. 15 shows a sequence of images demonstrating the super-wetting behavior of water on laser patterned areas of the MSQ-HFS coating for (a)-(b) room temperature conditions (T=25° C.), and (c)-(d) T=138° C. The time difference from (a) to (b) is 1.0 s, and (c) to (d) is 0.4 s. Images were captured with a high speed camera mounted overhead at a frame rate of 250 s$^{-1}$. The size of the laser patterned areas is 6.4 cm$^2$; water droplet volumes are <10 µL.
Figure 15:
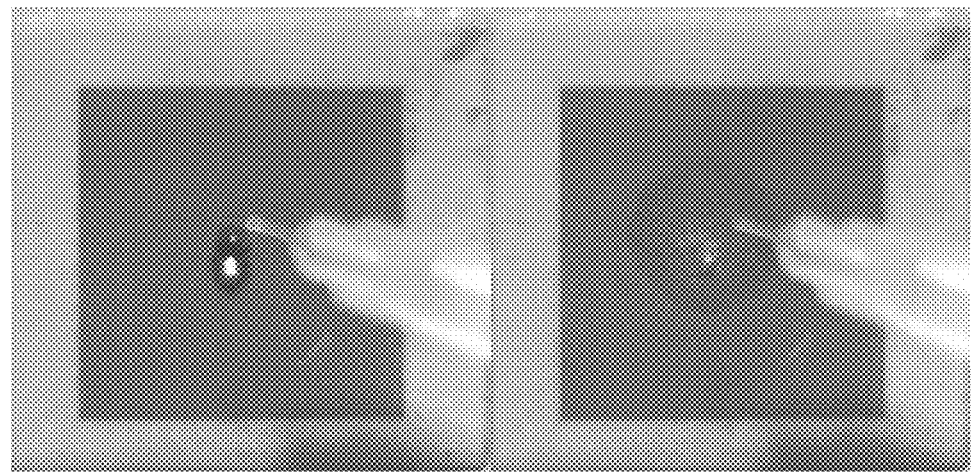

The durability of the laser treated MSQ-HFS coatings to thermal stresses was verified by dispensing repeatedly (30 cycles) mm-sized water droplets on them at temperatures up to 150° C. and examining their wetting behavior afterwards. FIG. 15.

Example 6

Materials and Methods Used in Examples 1-5

The materials used were: isopropanol (IPA, Sigma-Aldrich, USA), methylsilsesquioxane resin (Gelest, Inc.; 19-21 wt. % in a mixture of methanol, n-butanol, and isopropanol), and hydrophobic fumed silica, Aerosil®; silane or siloxane modified silica).

Dispersion and Coating Preparation:

In a 20 mL glass vial, hydrophobic fumed silica and IPA were combined and probe sonicated (Sonics®, 750 W, High Intensity Ultrasonic Processor, 13 mm diameter tip at 30% amplitude) to form a suspension. Once a stable HFS-IPA suspension was formed, the MSQ solution in alcohol was added, and the entire dispersion was sonicated until a stable dispersion formed. Typical sonication procedures lasted 1-2 min under ambient conditions; longer sonication times resulted in undesirable boiling loss of the alcohol solvents. Stable dispersions (Table 1) were then spray cast with an airbrush atomizer (Paasche VLS, siphon feed, 0.73 mm nozzle) onto stainless steel, aluminum foil, copper, quartz, and glass slide substrates at a spray distance of 10 cm and were subsequently heated with a heat gun (Proheat® Varitemp® PH-1200, 1300 W max) to immediately remove solvents, and an oven at 130° C. for 1 hr to allow the coating to dry. Alternatively, thermal treatment—for the purposes of inducing a wettability transition—was done with either a propane flame or a $CO_2$ laser (100 W max, 25 μm spot size, mounted on a computer-controlled 3-axis stage; output power is controlled by a percentage of maximum power, i.e., 1.0% power corresponds to ~1 W). For some samples, laser patterning was used to form repeating islands of either hydrophobic or hydrophilic nature.

TABLE 1

Composition of Dispersions Used to Make MSQ-HFS Coatings

| Ingredient | Concentration (wt %) |
|---|---|
| 20% MSQ in alcohol | 16.7 |
| Hydrophobic fumed silica | 0.0-8.3 |
| Isopropanol | 83.3-75.0 (balance) |

Characterization:

Environmental scanning electron microscope (ESEM, Philips XL30 ESEM-FEG) and scanning electron microscope (SEM, Hitachi S-3000N, variable pressure) images were obtained after samples were sputter-coated with a conformal 5 nm thick layer of Au—Pd or Pt—Pd. X-ray photoelectron spectroscopy (XPS, Kratos AXIS-165) was performed on heat gun-treated, flame-treated, and laser-treated MSQ-HFS coatings deposited on stainless steel, to investigate the effect of thermal treatment on the surface chemistry of the coating. Thermogravimetric analysis (TGA) was performed to determine degradation temperatures and reveal the related mechanisms. Sessile, advancing and receding contact angle values were obtained with a backlit, optical, high speed image acquisition setup (Redlake MotionPro) utilizing 10 μL water droplets. Coating heat treatment—for the purposes of analyzing the effect of temperature on wettability—was done with a standard hot-plate. Each sample was kept at a constant, elevated temperature for 1 hr (e.g., 200° C., 300° C., etc.) and then was removed and allowed to cool down to ambient temperature. Each sample was subsequently characterized by sliding angle measurements with 5.0 μL water droplets on a tilting stage with 1° accuracy.

We claim:

1. A method for preparing a hydrophobic coating comprising:
   (a) forming a dispersion of a hydrophobic silsesquioxane (HSQ) and a hydrophobic fumed silica (HFS) in an alcohol;
   (b) depositing the dispersion onto a surface as a coating; and
   (c) drying the coating to evaporate the alcohol,
   wherein the HFS/HSQ ratio is greater than 1.0.

2. The method of claim 1, wherein the hydrophobic silsesquioxane has the formula:

$$RSiO_{1.5}$$

wherein R is selected from the group consisting of hydrogen, an alkyl, an alkylene, an aryl, an arylene, an organo-functional derivative of an alkyl group, an organo-functional derivative of an alkylene group, an organo-functional derivative of an aryl group, and an organo-functional derivative of an arylene group.

3. The method of claim 2, wherein the hydrophobic silsesquioxane is selected from the group consisting of hydrogen silsesquioxane and methyl silsesquioxane.

4. The method of claim 3, wherein the HSQ is methyl silsesquioxane and presented as a 20 wt % mixture in alcohol, prior to forming the dispersion.

5. The method of claim 2, wherein the coating exhibits an advancing contact angle of at least 150°.

6. The method of claim 1, wherein the deposition is via spray deposition.

7. The method of claim 1, wherein the coating exhibits a water droplet sliding angle of less than 10°.

8. The method of claim 1, further comprising introducing a hydrophilic area(s) to the hydrophobic composition, wherein an area of the hydrophobic coating is subjected to heat to decrease the hydrophobicity (increase hydrophilicity) of the area, wherein the hydrophilic area has an advancing contact angle of equal to or less than 10°.

9. The method of claim 8, wherein the advancing contact angle of the hydrophilic area is less than 5°.

10. The method of claim 9, wherein the advancing contact angle of the hydrophilic area is 0°.

11. The method of claim 8, wherein the heat applied to the hydrophobic coating is above 500° C.

12. The method of claim 8, wherein the heat is applied via a $CO_2$ laser or a propane flame.

13. The method of claim 1, wherein the surface comprises a material selected from the group consisting of steel, aluminum, copper, quartz, glass, fabric, and silicon.

14. The method of claim 1, wherein the alcohol is selected from the group consisting of methanol, n-butanol, ethanol, isopropanol, and a combination thereof.

15. The method of claim 1, wherein the HFS is a silica that is modified with a compound selected from the group consisting of a silane, a silazane, and a siloxane.

16. The method of claim 15, wherein the HFS is a siloxane-modified silica.

17. The method of claim 15, wherein the HFS is a silane-modified silica.

18. The method of claim 1, wherein the dispersion comprises from 3 wt % to 3.5 wt % of HSQ, from 0.5 wt % to 8.5 wt % of HFS, and from 88 wt % to 97 wt % of alcohol.

19. The method of claim 1, wherein the dispersion is formed via sonication.

* * * * *